United States Patent [19]

Nomura

[11] 4,262,765
[45] Apr. 21, 1981

[54] FARM VEHICLE

[75] Inventor: Takashi Nomura, Osaka, Japan

[73] Assignee: Kubota, Ltd., Osaka, Japan

[21] Appl. No.: 78,324

[22] Filed: Sep. 24, 1979

[30] Foreign Application Priority Data

Feb. 15, 1979 [JP] Japan .............................. 54-19647[U]
Feb. 16, 1979 [JP] Japan .............................. 54-19157[U]

[51] Int. Cl.³ ............................................. B62D 51/06
[52] U.S. Cl. ................................ 180/19 R; 180/19 H;
180/315
[58] Field of Search ................. 180/19 R, 19 H, 19 S,
180/6.66, 315, 323, 326, 329, 330, 331, 332;
74/524, 469

[56] References Cited

U.S. PATENT DOCUMENTS

| | | | |
|---|---|---|---|
| 2,626,671 | 1/1953 | Hardy et al. | 180/6.66 |
| 2,684,740 | 7/1954 | Mader | 180/19 R |
| 3,347,558 | 10/1967 | Grimes et al. | 180/329 |
| 3,738,441 | 6/1973 | Kemner | 180/19 H |

FOREIGN PATENT DOCUMENTS

778659 7/1957 United Kingdom .................. 180/19 R
877186 9/1961 United Kingdom .................. 180/19 R

*Primary Examiner*—Randolph A. Reese
*Assistant Examiner*—Donn McGiehan
*Attorney, Agent, or Firm*—Jordan and Hamburg

[57] ABSTRACT

A farm vehicle comprising reversible steering handles, a pair of right and left steering clutches, a pair of right and left control means for the clutches, and a clutch connection switch mechanism to switch connection between the clutches and the control means. The clutch connection switch mechanism includes a disc cam or cams and a pair of cam followers in order to be operable by reversing oscillations of the steering handles.

5 Claims, 5 Drawing Figures

FARM VEHICLE

BACKGROUND OF THE INVENTION

This invention relates to farm vehicles adapted for backward operation such as back plowing. To facilitate backward operation, such a vehicle comprises steering handles reversible relative to the vehicle body by oscillating on a cylindrical column securedly standing on a transmission case, and a switch mechanism for clutch connection adapted to automatically select a combination for integral rotation from a pair of drive rotatable elements interlocked with a pair of right and left control means mounted on the steering handles and a pair of driven rotatable elements interlocked with a pair of right and left steering clutches mounted in the transmission case by sliding a pair of interlocking elements integrally slidable with a slidable and lockable control rod, whereby the steering clutches are operated smoothly and correctly whether the steering handles are in a position for forward traveling or a position for backing.

Conventional farm vehicles of this type are equipped with an automatic switch mechanism for steering clutch connection comprising a cam and a cam follower to press and slide the control rod toward one end thereof with an oscillation of the steering handles from the position for forward traveling to the position for backing or vice versa, and a spring to cause a return slide of the control rod toward the other end thereof, to thereby automatically switch the clutch connection by means of the oscillations of the steering handles. In the above arrangement, the automatic sliding performance of the control rod toward one end by the camming action may be maintained excellently and reliably over a long period of time, but the automatic sliding performance of the control rod toward the other end tends to grow poor in a short time due to deterioration in the elasticity of the spring used. Consequently, a smooth automatic switching of the clutch connection cannot last long, and trouble with clutching operation can arise easily.

SUMMARY OF THE INVENTION

In view of the above noted problem, the object of this invention is to provide a farm vehicle capable of a reliable and smooth automatic switching of right and left steering clutch connection over a long period of time.

To this end, a farm vehicle according to this invention is characterized by a switch mechanism comprising disc cam means mounted on the cylindrical column or the steering handles, and a pair of cam followers contacting a periphery of the cam means and interlocked with the control rod, whereby the clutch connection switch mechanism is operable by oscillations of the steering handles on the cylindrical column.

In this invention both the forward slide and the backward slide of the control rod are caused by the mechanical force of the cam and the pair of cam followers, which assures the automatic reciprocation of the control rod by means of reversals of the steering handles. Therefore this invention on the whole assures, over a long perid, a reliable and smooth automatic switching of right and left steering clutch connection by means of reversals of the steering handles, and fully prevents trouble arising in clutch operation. The right and left steering clutches may be operated easily with the same operational sense before and after a reversal of the steering handles.

A further feature of this invention is that the control rod is arranged to extend between and secured to free ends of opposing portions of a movable frame, to which portions the cam followers are attached, and therefore the opposing frame portions are parallely supported by the steering handles. This serves to prevent a twist between the movable frame/control rod joint and the steering handles and to provide for a smooth reciprocation of the control rod.

Other objects and advantages of this invention will be apparent from the following description.

BRIEF DESCRIPTION OF THE DRAWINGS

In the drawings illustrating a farm vehicle according to this invention.

DETAILED DESCRIPTION OF THE PREFERRED EMBODIMENTS

Figure 1:
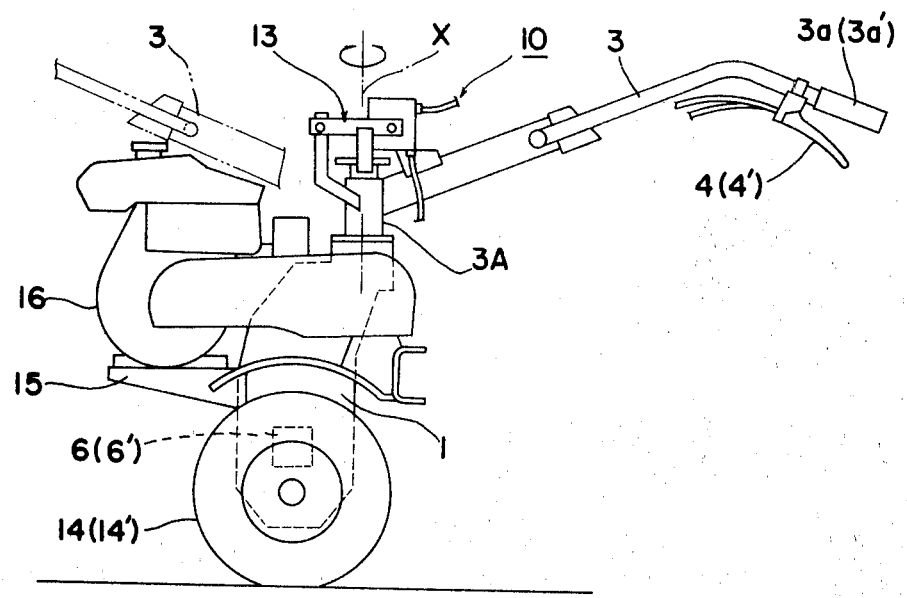
FIG. 1 is a side view of a farm vehicle of the type used by the walking operator.

FIG. 1 shows, as an example of a farm vehicle, a plowing machine of the type used by a walking operator comprising a vertical transmission case 1, a pair of right and left drive wheels 14 underneath the transmission case 1 which are replaceable with a rotary plow, steering handles 3 attached to the top of the transmission case 1 reversible relative to the vehicle body by oscillating on a vertical axis X, and a motor section 16 mounted on a frame 15 extending forwardly from the transmission case 1. Numerals 4 and 4' indicate lever type control means provided adjacent to grips 3a and 3a' of the steering handles 3 for controlling a pair of right and left steering clutches 6 and 6' contained in the transmission case 1.

Figure 2:
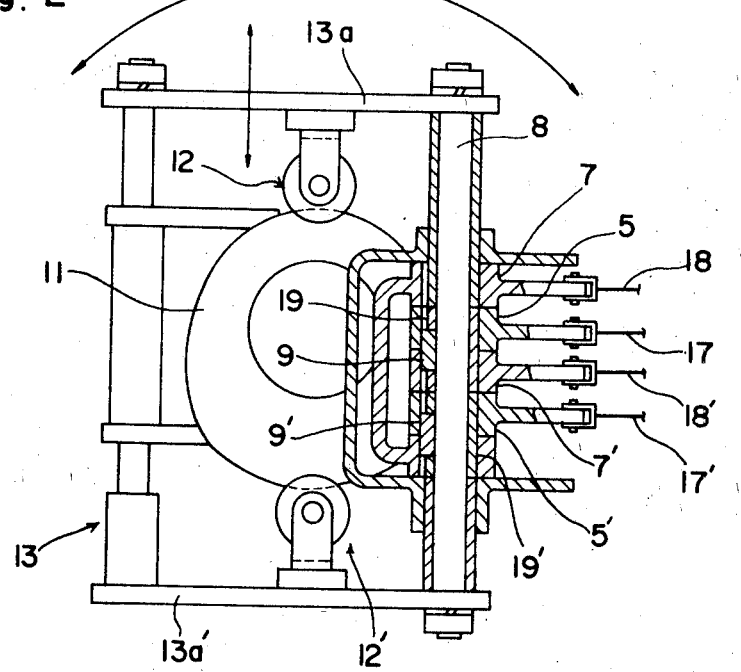
FIG. 2 is an enlarged plan view in cross section of a principal part of the vehicle.
Figure 3:
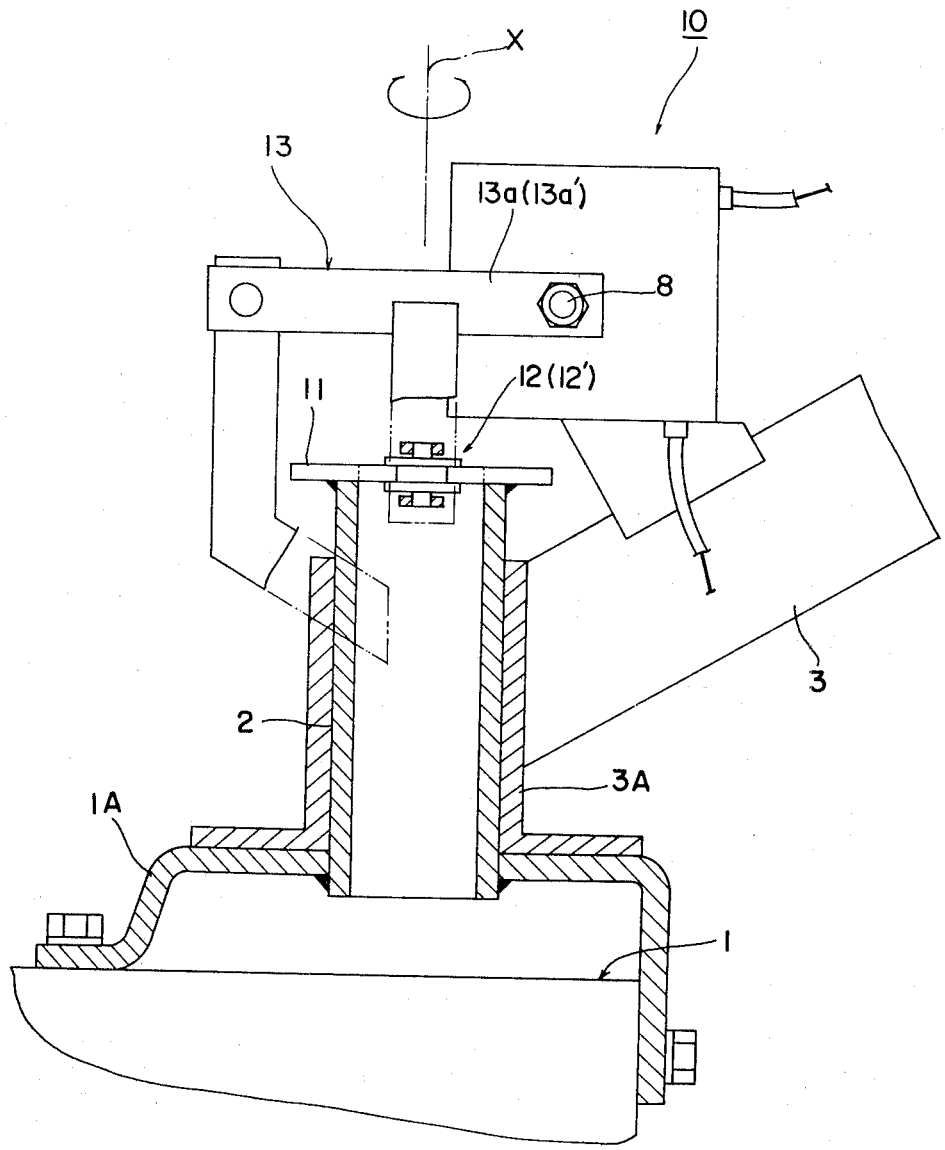
FIG. 3 is an enlarged side view in vertical section of the principal part.

FIGS. 2 and 3 show a structure for attaching the handles 3 to the transmission case 1 and the construction of a clutch connection switch mechanism 10 to switch a connection between the steering clutches 6 and 6' and the control means 4 and 4' as the handles 3 change from a forward facing position to a rearward facing position or vice versa.

The attaching structure for the handles 3 comprises a cylindrical column 2 secured to a plate 1A mounted on the transmission case 1 so as to extend along the vertical axis X, and a tubular member 3A at a base end of the handles 3 fitted on the cylindrical column 2 to be permitted only to rotate thereabout, whereby the handles 3 are oscillatable on the vertical axis X.

The clutch connection switch mechanism 10 comprises a control rod 8 mounted for reciprocation adjacent to the base of handles 3 and carrying a pair of drive rotatable elements 5 and 5' and a pair of driven rotatable elements 7 and 7' arranged alternately as shown, the rotatable elements 5, 5', 7 and 7' being rotatable relative to one another and slidable relative to the control rod 8. The rotatable elements 5 and 5' are connected to the pair of right and left control means 4 and 4' by means of Bowden wires 17 and 17', and the rotatable elements 7 and 7' are connected to the pair of right and left steering clutches 6 and 6' by means of Bowden wires 18 and 18'.

The control rod 8 further carries a pair of collars 19 and 19' fitted between the control rod 8 and the rotatable elements 5, 5', 7, and 7' and provided with a pair of interlocking elements 9 and 9'. The collars 19 and 19' are only rotatable and not slidable relative to the control rod 8 while they are both rotatable and slidable relative to the rotatable elements 5, 5', 7 and 7'. Thus, a reciprocal sliding of the control rod 8 causes the switching of clutch connection. To be particular, as the control rod 8 slides toward one end thereof, the pair of interlocking elements 9 and 9' engage one of the drive rotatable elements 5 and one of the driven rotatable elements 7 to link the two elements 5 and 7 for integral rotation, and the other drive rotatable element 5' and the other driven rotatable element 7' to link the two elements 5' and 7' for integral rotation. As the control rod 8 slides toward the other end thereof, the interlocking elements 9 and 9' engage the one of the drive rotatable element 5 and the other driven rotatable element 7' to link the two elements 5 and 7' for integral rotation, and the other drive rotatable element 5' and the one of driven rotatable element 7 to link the two elements 5' and 7 for integral rotation.

On top of the cylindrical column 2 is disc cam means which is a disc cam 11 in this embodiment. The handles 3 support at the base end thereof a movable frame 13 of channel shape in plan view slidable parallel to the control rod 8. The movable frame 13 includes oppositely disposed arm portions 13a and 13a' carrying roller type cam followers 12 and 12' respectively at intermediate positions thereof, the cam followers 12 and 12' being in contact with opposite peripheral positions of the disc cam 11, whereby the movable frame 13 is made to slide reciprocally with reversals of the handles 3. The control rod 8 is arranged to extend between and be secured to free ends of the frame portions 13a and 13a', and thus the reversing of the handles 3 causes reciprocation of the control rod 8 which effects automatic switching of clutch connection.

The steering handles 3 are adapted to be lockable at six positions, namely normal positions facing forward and rearward and positions slightly rotated left and right from the normal positions.

The portions of the periphery of the disc cam 11 contacted by the cam followers 12 and 12' when the steering handles 3 lie within an oscillatory range between the right and left rotated positions have arcuate surfaces lying about the axis X of oscillations of the handles 3, to maintain the cam followers 12 and 12' equidistant from the axis X. The remaining peripheral portions of the disc cam 11 are shaped such that one of the cam followers 12 and 12' is pressed to slide the movable frame 13 upon reversal of the handles 3.

Figure 4:
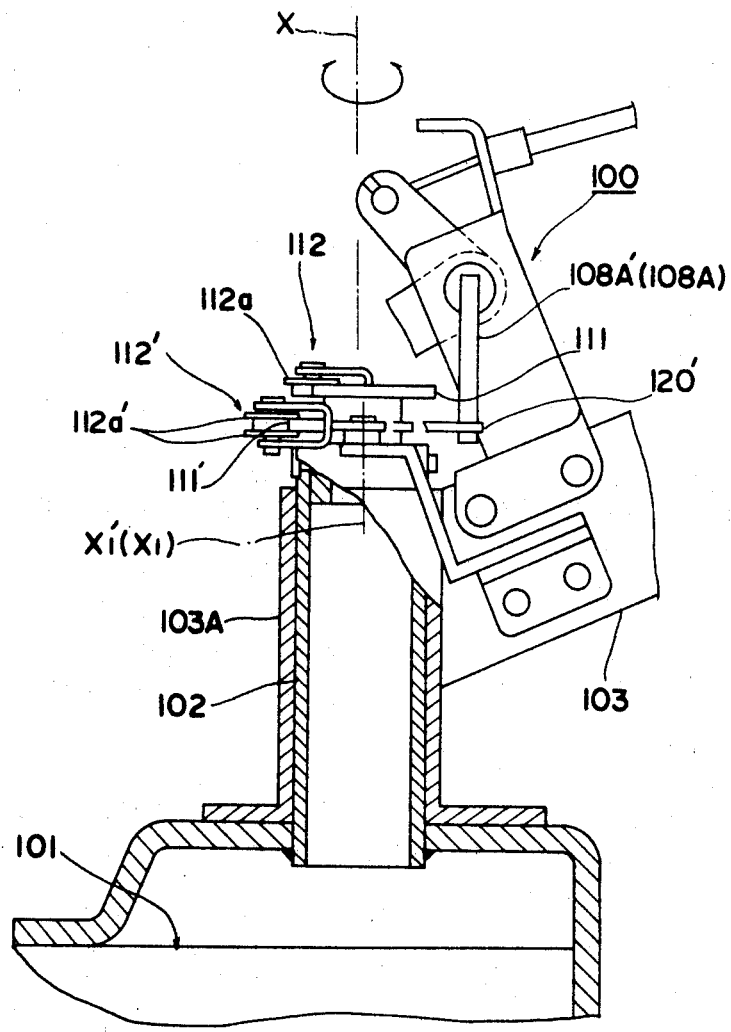
FIG. 4 is an enlarged side view in vertical section of a modified principal part.
Figure 5:
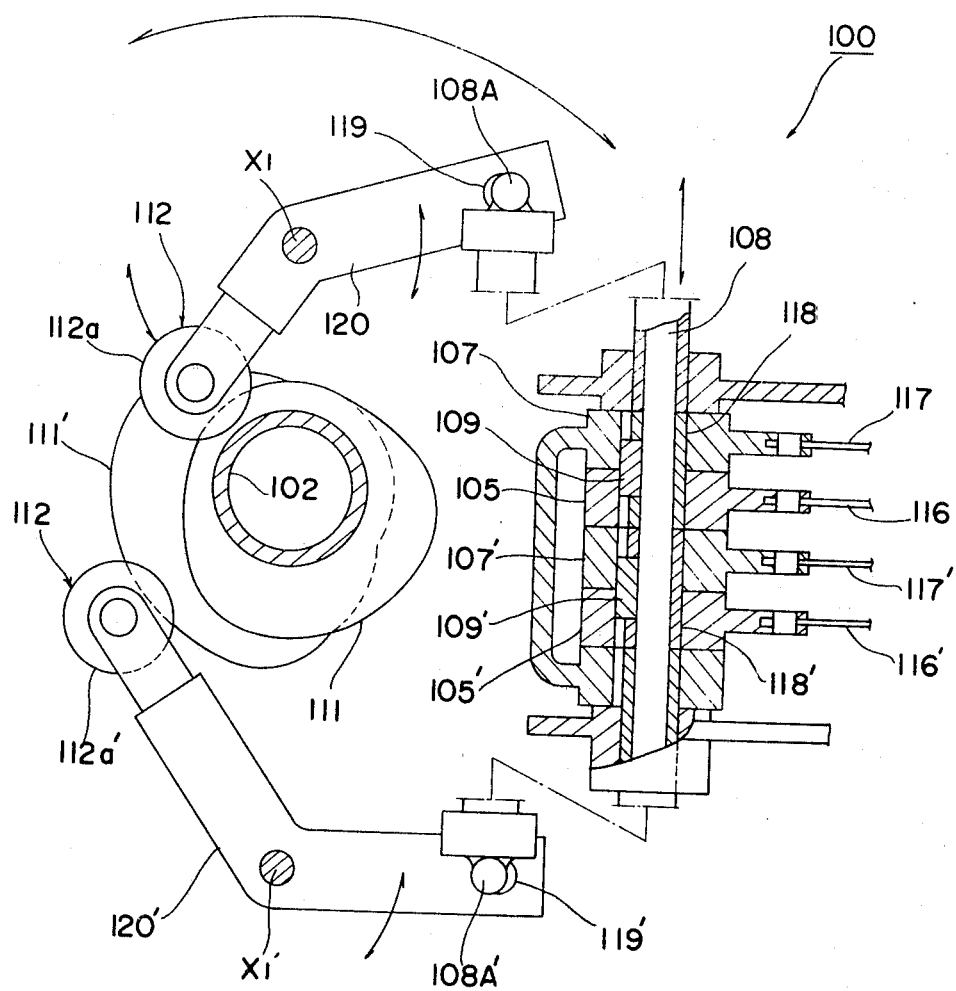
FIG. 5 is an enlarged plan view in vertical section corresponding to FIG. 4.

FIGS. 4 and 5 show another embodiment of this invention as applied to the principal part of a farm vehicle, in which a clutch connection switch mechanism 100 and steering handles 103 are attached to the vehicle body in substantially the same manner as in the foregoing embodiment. The components common to the two embodiments are listed below without detailed descriptions thereof. Thus, FIG. 4 shows a transmission case 101, a cylindrical column 102, steering handles 103 and a tubular member 103A at the base of the handles 103. FIG. 5 shows drive rotatable elements 105 and 105', driven rotatable elements 107 and 107', interlocking elements 109 and 109', Bowden wires 116 and 116' connected to a pair of right and left control means (not shown), and Bowden wires 117 and 117' connected to a pair of right and left steering clutches (not shown).

Turning now to the construction different from that of the first embodiment, there are two cams 111 and 111' secured to the top of the cylindrical column 102 one above the other with a 180 degree phase difference of rotation. The handles 103 are provided with a pair of oscillatable members 120 and 120' linked by means of elongate perforations 119 and 119' with the lower ends of rods 108A and 108A' depending from either ends of a control rod 108, the oscillatable members 120 and 120' being oscillatable on axes X1 and X1' parallel to the axis X of oscillations of the handles 103 and adapted to move portions thereof linking with the rods 108A and 108A' in the same direction and amount along the direction in which the control rod 108 slides. The oscillatable members 120 and 120' carry at tip ends thereof cam followers 112 and 112' contacting the cams 111 and 111' respectively to oscillate the oscillatable members 120 and 120' as described above with oscillations of the handles 103. As the handles 103 are turned to the forward facing position, one of the cams 111 and one of the cam followers 112 act to press and slide the control rod 108 in one direction. As the handles 103 are turned to the rearward facing position, the other cam 111' and cam follower 112' press and slide the control rod 108 back in the other direction.

The cam followers 112 and 112' comprise rollers having flanges 112a and 112a' to fix vertical positions thereof relative to the cams 111 and 111'.

I claim:

1. In a farm vehicle comprising steering handles reversible relative to a vehicle body by oscillating on a cylindrical column securely standing on a transmission case, and a clutch connection switch mechanism adapted to automatically select a combination for integral rotation from a pair of drive rotatable elements interlocked with a pair of right and left control means mounted on the steering handles and a pair of driven rotatable elements, interlocked with a pair of right and left steering clutches mounted in the transmission case by sliding a pair of interlocking elements, integrally slidable with a slidable and lockable control rod, said switch mechanism comprising:

disc cam means mounted on said cylindrical column, and a pair of cam followers contacting a periphery of said cam means and interlocked with said control rod, whereby said clutch connection switch mechanism is operable by oscillations of said steering handles on said cylindrical column.

2. A mechanism of claim 1 wherein said disc cam means comprises one disc cam mounted on top of said cylindrical column and said cam followers are arranged at opposite positions on the periphery of said disc cam and parallel to said control rod.

3. A mechanism of claim 2 further comprising a movable frame having a channel shape in plan view and supported by said steering handles slidably in axial directions of said control rod, said cam followers being respectively attached to opposite arms of said channel shaped movable frame, said control rod extending between and secured to free ends of said arms.

4. A mechanism of claim 3 wherein said disc cam has a peripheral shape to prevent said movable frame from sliding at a point during an oscillation for reversal of said steering handles.

5. A mechanism of claim 1 wherein said disc cam means comprises two disc cams disposed one above the other with a 180 degree phase difference of rotation, and said cam followers are arranged in opposing relation to one another and respectively in contact with said disc cams.

* * * * *